(No Model.) 3 Sheets—Sheet 1.
R. E. SHANNON
REIN HOLDER.
No. 258,679. Patented May 30, 1882.
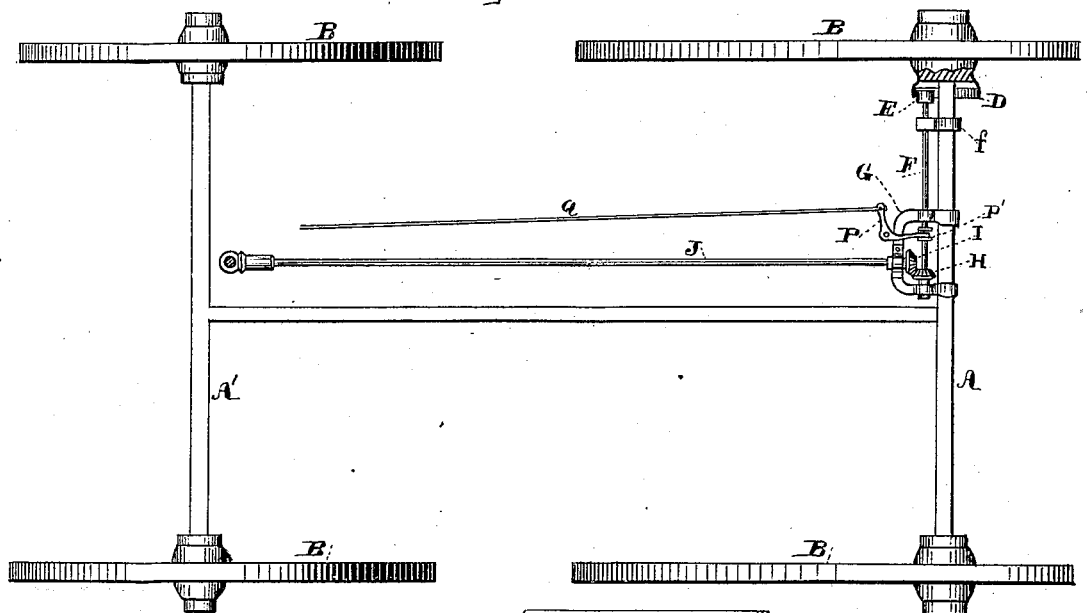
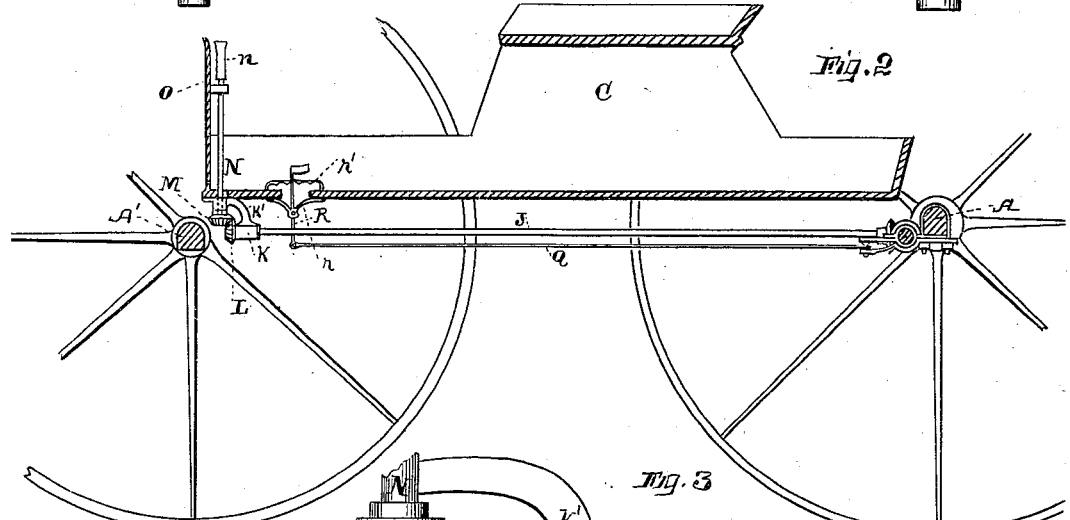
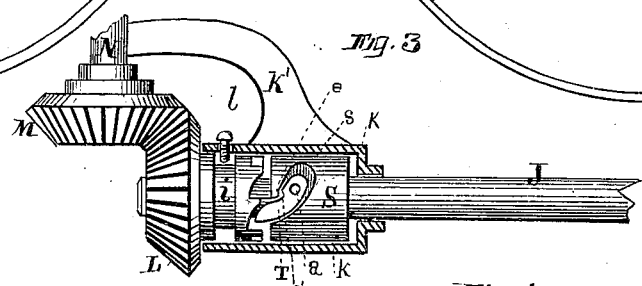
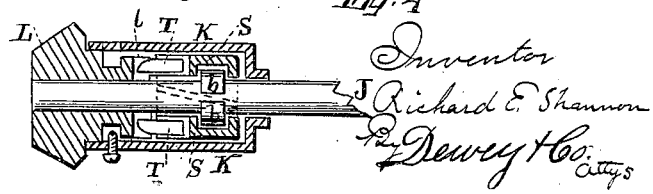
Witnesses
Geo. H. Strong.
Frank R. Brooks
Inventor
Richard E. Shannon
By Dewey & Co.
Attys (No Model.) 3 Sheets—Sheet 2.

R. E. SHANNON.
REIN HOLDER.

No. 258,679. Patented May 30, 1882.

Witnesses
Geo. H. Strong
Frank A. Brooks

Inventor
Richard E. Shannon
By Dewey & Co.
Attys

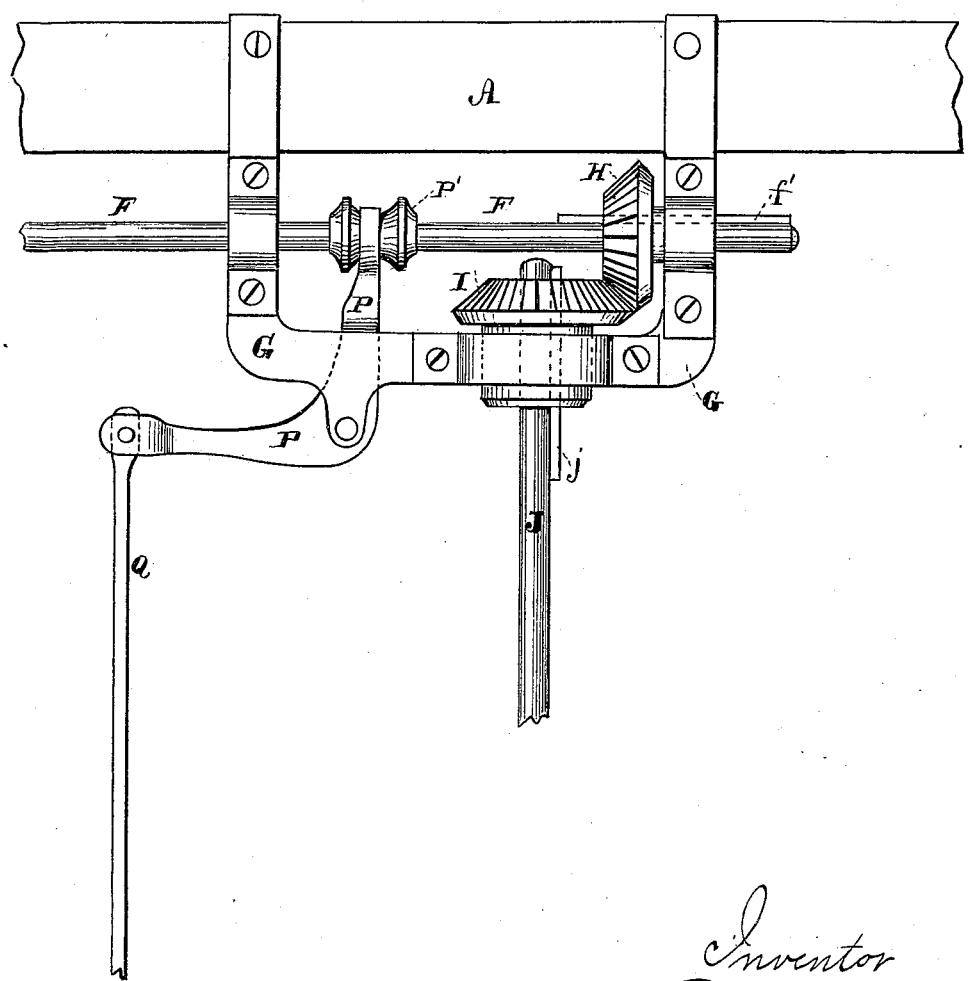

UNITED STATES PATENT OFFICE.

RICHARD E. SHANNON, OF SAN FRANCISCO, CALIFORNIA, ASSIGNOR OF ONE-HALF TO ADOLPH T. F. OBERMEYER, OF SAME PLACE.

REIN-HOLDER.

SPECIFICATION forming part of Letters Patent No. 258,679, dated May 30, 1882.

Application filed December 13, 1881. (No model.)

*To all whom it may concern:*

Be it known that I, RICHARD E. SHANNON, of the city and county of San Francisco, State of California, have invented a Horse-Holding Attachment for Vehicles; and I hereby declare the following to be a full, clear, and exact description thereof.

My invention relates to a new and useful horse-holding attachment for vehicles of that class in which the motion of the wheel is caused to wind up and draw upon the reins through intermediate gearing, of which said class my invention, for which Letters Patent No. 237,615, February 8, 1881, were granted to me, is an example.

This my present invention is an improvement upon my former one shown in said patent; and it consists simply in a novel intermediate mechanism whereby the motion of the vehicle is caused to wind up the reins.

Figure 9:
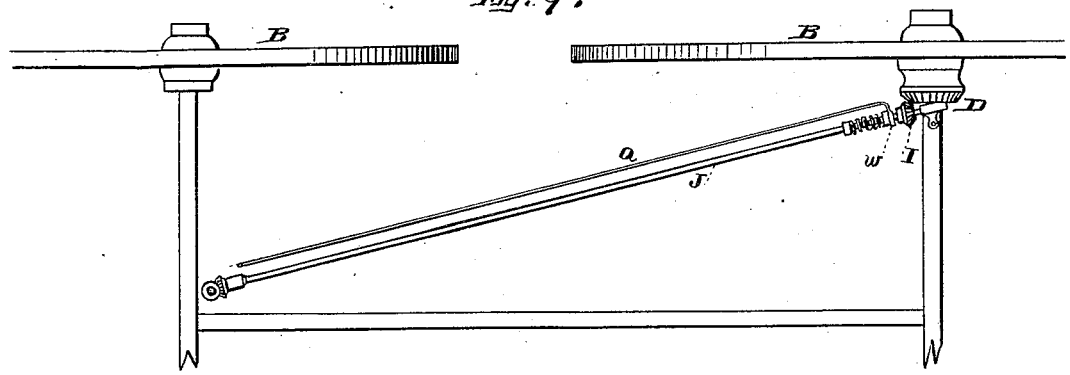

Referring to the accompanying drawings, Figure 1 represents a top view of the running-gear of a vehicle with my attachment. Fig. 2 represents a side view of same. Figs. 3, 4, 5, 6, 7, and 8 show details of construction. Fig. 9 shows a modification.

Let A represent the rear axle, and A' the forward one; B, the wheels, and C the body. The hub of one of the rear wheels, preferably the right-hand rear one, as shown, is provided with gear-teeth D, these being upon the inner periphery of the inner side. With these teeth mesh those of a pinion, E, upon the outer end of a rod or shaft, F. This rod is loosely journaled in guides *f*, which are clipped to the axle, and it can revolve and move laterally in said guides.

Figure 5:
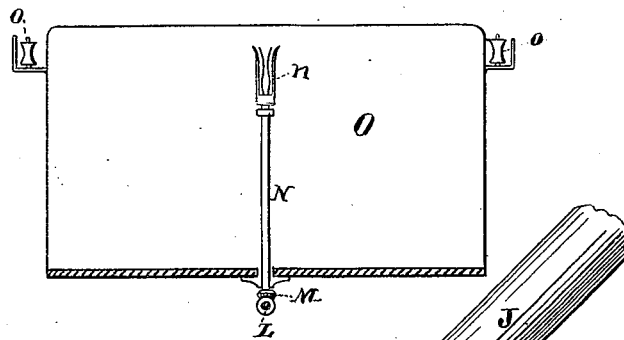

G represents a bracket clipped rigidly to the axle. This has two arms, as shown in Fig. 8, through which the rod F loosely passes, being journaled therein. The end of rod F is provided with a feather, *f'*, upon which is a bevel-pinion, H, which meshes with a bevel-pinion, I, upon the rear end of a shaft, J, which is journaled in the bracket G. This shaft has a feather, *j*, upon it, so that it may move forward or back within the pinion I, and yet be affected by its revolution. The shaft J extends lengthwise under the body to a point just in the rear of the forward axle. It extends through a boxing, K, forming part of a bracket, K', which is secured to the bottom of the body. The end of shaft J is adapted, as will be fully explained hereinafter, to engage with a bevel-pinion, L, set loosely upon it, and to cause it to revolve when engaged. This pinion L meshes with another pinion, M, fixed upon the lower end a vertical rod, N, which extends upwardly within the vehicle just behind the dash-board O. This rod is not quite as high as the dash-board, and is provided upon its top with a forked piece, *n*, as shown in Fig. 5. Upon each side of the dash-board are spool-rollers *o*.

The general operation thus far is as follows: When the driver stops and is about to alight he lets the lines or reins fall one on each side of the dash-board, bringing them around the spools *o* inside, and lets them drop into the forked end *n* of the rod N. The horse by starting causes the wheel to move forward. Its cogged hub D, meshing with pinion E, revolves rod F, whose pinion H, meshing with pinion I, revolves shaft J. This shaft engages its forward end with the pinion L, which, meshing with pinion M, revolves rod N and winds up the reins thereon, thus checking the horse.

In order to throw the mechanism in and out of gear with the wheel, I have the following: The rod F is journaled loosely in its bearings and is feathered in pinion H, so that it may be moved in the direction of its length, which movement would withdraw its pinion E from the hub of the wheel or throw it into gear therewith. Upon the rod F is a grooved ring or flange, P', with which a clutch-lever, P, pivoted to the bracket G, engages. This lever has the shape of a bell-crank lever, and has pivoted to its other end a rod, Q, which extends forward and is pivoted to an upright foot-lever, R, which is pivoted to a bracket, *r*, and extending upward into the body of the vehicle within reach of the foot. The foot-lever engages with a rack-bar, *r'*, whereby it is held in suitable position. When the vehicle stops the driver pulls back the lever with his foot. This draws rod Q forward, and causes the clutch-lever P to force the rod F outwardly and engage its pinion E with the cogged hub of the wheel. Moving the foot-lever in an opposite direction throws it out of gear.

One of the necessities of this invention is that the horse shall be instantly released the moment after he is checked. When the reins are drawn upon him he has a tendency to back, and if he were not relieved he would continue to back or become excited and do some injury to the vehicle. I have so arranged this device that the moment he backs he will be released, and this I accomplish by causing the backward movement of the wheel to throw the shaft J out of gear with its loose pinion L, and thus allow the rod N to unwind without reference to the other parts.

By referring to Figs. 3, 4, 6, and 7 my explanation will be rendered plain. The shaft J is provided upon its forward end with small pins or lugs $a$ $a$, Fig. 6, and a small spring, $b$, loosely encircles it just behind the pins, Figs. 4 and 6.

Figure 6:
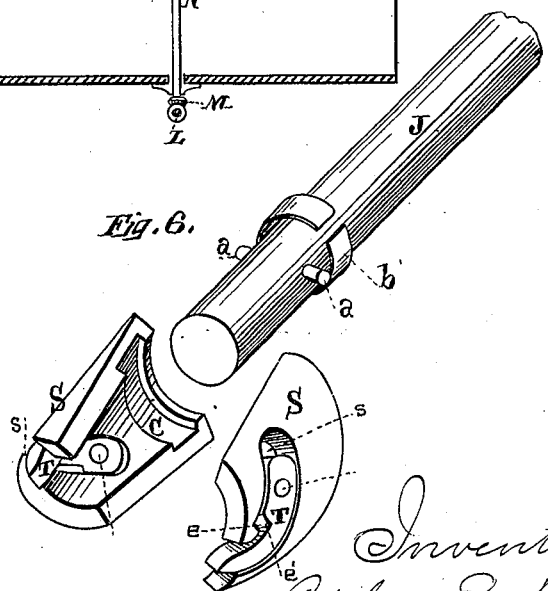

S is a sleeve, Fig. 3, which is divided into halves, Fig. 6. It has a channel or groove, $c$, upon the rear end of its inner side, into which the spring $b$ fits when the sleeve is upon the shaft J. In this sleeve, opening out of the forward end, are curved slots $s$, one in each half of the sleeve, and placed in the same relative position in each. In one side of these slots is made a shoulder, $e$.

T T are curved pawls, fitting their rear ends over the lugs $a$ $a$ and lying in the curved slots $s$. These are of such a length that they will lie entirely within the curved slots without having their points project. They have shoulders $e'$, which are adapted to abut against the shoulders $e$ and prevent the pawls from going out beyond a certain point. These pawls, being thus attached to the shaft J and lying within the curved slots $s$, will, when said shaft is revolved in one direction, follow the curve of the slots and project their points beyond the forward end of the sleeve S, and when the shaft is reversed will withdraw them. The sleeve S fits within the boxing K. The action of the spring $b$ is to cause the halves of the sleeve S to press outwardly upon the boxing K, and thus produce sufficient friction to allow the prior projection of the pawls T before said sleeve begins to turn to operate the gearing. The pawls have to be thrown out or withdrawn upon the first movement of the shaft J; but this would not result if the sleeve $s$ moved at once. It is therefore, by means of the slight friction, held an instant while the pawls are moved.

Figure 7:
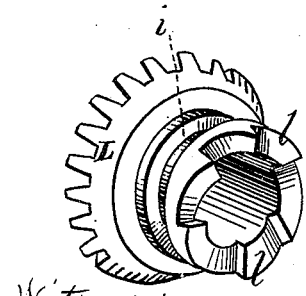

Figs. 3, 4, and 7 show the pinion L. This is provided with a hub having a ratchet, $l$, with which the pawls T are adapted to engage. It has also a circumferential groove, $i$, upon its hub. This pinion fits upon the end of shaft J loosely, its hub extending within the boxing K, through which small screws are placed, which, penetrating the groove $i$ in the pinion-hub, hold said pinion in place while still allowing it to turn. Suppose, now, that, the vehicle being at a standstill and the pinion E in gear with the hub of the wheel, the horse should start. As before described, motion is at once transmitted to the shaft J. This in revolving throws the pawls forward, said shaft being allowed to make this necessary slight forward movement by the pinion I being on a feather, as described. The pawls thus thrown out engage with the ratchet $l$ upon the pinion L. The pawls have now reached their limit by reason of their shoulders $e'$ abutting against shoulders $e$, and the revolution of shaft J is transmitted to the whole sleeve S, which, revolving with its pawls, turns pinion L, and, as before described, winds up the reins upon rod N, thus checking the horse. The moment he finds himself drawn up he backs, the wheel reverses, and the shaft J is reversed. By this movement it withdraws the pawls T within the sleeve and disengages the ratchet $l$ of the pinion L, so that said pinion is freed and will allow the strain upon the rod N to be relieved by said rod unwinding. Thus the least backward movement of the horse will relieve him instantly. In Fig. 9 I have shown a modification of my device. In this case I dispense with the rod F and transmit motion directly from the wheel to the shaft J. The operation of this is obvious.

The shaft J is appropriately journaled under the vehicle-body, extending diagonally, as shown. It carries on its end a pinion, I, upon a feather, which said pinion meshes with the teeth D upon the hub.

Q is the rod secured under the body, and which throws it in and out of gear. This embraces the clutch-ring of the pinion, as shown at $w$, and pulls said pinion away from the hub when necessary.

The rest of the mechanism is the same as that described, and needs no further description.

Having thus described my invention, what I claim as new, and desire to secure by Letters Patent, is—

1. The combination of the bracket K', with its boxing K, divided sleeve S, with its curved slots $s$, having shoulders $e$, and the shaft J, with its spring $b$, lugs $a$, and pawls T, having shoulders $e'$, and the loose pinion L, with its ratchet-hub $l$ and groove $i$, substantially as and for the purpose herein described.

2. The combination and arrangement of the shaft J, with its feathered pinion I, and its spring $b$, lugs $a$, and pawls T, with their shoulders $e'$, sleeve S, with its curved slots $s$, having shoulders $e$, loose pinion L, with its ratchet-hub $l$ and groove $i$, bracket K', with its box K, pinion M, and rod N, with its forked head $n$, substantially as and for the purpose herein described.

3. The dash-board O, having the spools $o$ $o$ upon its side, in combination with the winding-shaft N, substantially as and for the purpose herein described.

In witness whereof I have hereunto set my hand.

RICHARD E. SHANNON.

Witnesses:
FRANK A. BROOKS,
WM. F. BOOTH.